(12) United States Patent
Rhee

(10) Patent No.: US 7,536,332 B2
(45) Date of Patent: May 19, 2009

(54) REAL LIFE IMPLEMENTATION OF MODERN PORTFOLIO THEORY (MPT) FOR FINANCIAL PLANNING AND PORTFOLIO MANAGEMENT

(76) Inventor: Thomas A. Rhee, 631 101 Holbrook Ct., Long Beach, CA (US)

( * ) Notice: Subject to any disclaimer, the term of this patent is extended or adjusted under 35 U.S.C. 154(b) by 1191 days.

(21) Appl. No.: 09/776,379

(22) Filed: Feb. 2, 2001

(65) Prior Publication Data

US 2002/0138383 A1 Sep. 26, 2002

(51) Int. Cl.
*G06Q 40/00* (2006.01)
(52) U.S. Cl. .............................. 705/36; 705/35; 705/37
(58) Field of Classification Search ............... 705/36 R, 705/36, 35
See application file for complete search history.

(56) References Cited

U.S. PATENT DOCUMENTS

| | | | | |
|---|---|---|---|---|
| 5,126,936 A | * | 6/1992 | Champion et al. | 705/36 R |
| 6,018,722 A | * | 1/2000 | Ray et al. | 705/36 R |
| 6,393,409 B2 | * | 5/2002 | Young et al. | 705/37 |
| 6,601,044 B1 | * | 7/2003 | Wallman | 705/36 R |
| 2002/0091605 A1 | * | 7/2002 | Labe et al. | 705/36 |

* cited by examiner

*Primary Examiner*—Jagdish N Patel

(57) ABSTRACT

An investment portfolio management method for rebalancing an investor's securities portfolio based on the specified investment parameters is provided. The method utilizes a conventional mean-variance efficient portfolio frontier analysis, which is often cited in Modern Portfolio Theory (MPT), one of the major scholarly developments in modern finance, finds its way into actual rebalancing the investor's security portfolio. A new way of constructing market portfolio is also suggested. The method offers an automatic, mathematical solution for asset allocation and cash management in real time, while managing and trading on portfolios of each asset class, e.g. commercial papers, repurchase agreements, money market funds, bonds, stocks, mutual funds, and other derivatives on an automatic mode.

3 Claims, 9 Drawing Sheets

REAL LIFE IMPLEMENTATION OF MODERN PORTFOLIO THEORY (MPT) FOR FINANCIAL PLANNING AND PORTFOLIO MANAGEMENT

The present invention relates generally to a system and method of financial planning and portfolio management and, more particularly, to a system and method of selecting and managing a portfolio of investment assets for maximizing investment returns under a set of user-specified investment preferences or strategies.

BACKGROUND OF THE INVENTION

Modern Portfolio Theory (MPT), especially in the context of Capital Asset Pricing Model (CAPM) first developed by William Sharpe and John Linter, assumes that an investor maximizes his/her terminal wealth by investment portfolio decisions made today. In making investment portfolio decisions, an investor attempts to examine every possible investment opportunity to form an efficient portfolio frontier and picks the most efficient portfolio vector for maximizing an investment return. Since every prudent investor would do this, the most efficient portfolio that he or she picks would be the same for all, given risk-free lending and borrowing rates. Such an investment portfolio is known as market portfolio.

However, people differ in their risk preferences. Consequently, some investors might mix their investments in market portfolio with risk-free or less risky assets, while others might prefer to invest exclusively in the market portfolio with borrowed funds. Alternatively, people might hold a well-diversified mutual fund, which generally will result in a similar risk-return profile as that achievable by an individual portfolio, which combines market portfolio and risk-free assets under the CAPM theory.

However, determining how individual asset returns are generated under conditions of market uncertainty is not provided by MPT. This has not only been a crucial element missing from MPT, but is also an important consideration to all investment practitioners in real world trading, because each individual security return would eventually determine the expected returns and variance of every portfolio containing that security and, hence, will determine the shape of the efficient portfolio frontier under MPT.

The originally developed CAPM has very little to say about how each individual security return is generated. Various improvements to the original CAPM have been proposed, such as the Single Index CAPM and various other forms of Multi-Factor CAPMs (with or without various taxes, transaction costs, inflation rates, and the like). On the other hand, Arbitrage Pricing Theory (APT) by Steve Ross proposes that whatever results the CAPM may have produced must be a result of the investor arbitrage. As a result, Professor Ross starts out with the theory of a k-factor return generating function for each individual security; and assumes that every investor would be interested in making risk-free profits by forming an arbitrage investment portfolio utilizing his pre-specified return generating function of linearity for each individual security. According to Professor Ross' theory, the final pricing formula for capital asset prices would be similar to that of the CAPM.

Factors determining individual security returns are proprietary to every security analyst. Every portfolio manager has his/her own set of factors. Generally, what determines the security returns follows a return generating function in a form described in equation (1) below $$R_i = \alpha_i + \sum_{i=1}^{k} \beta_{ij} F_j + \varepsilon_i \quad (1)$$

where $R_i$ is a rate of return on a security, i; $F_j$ is an investment style economic factor, j, affecting all security returns; $\alpha_i$ is a regression constant; $\beta_{ij}$ is the sensitivity of the return on a security, i, with respect to a change in factor, j. Those j factors may include industry identifiers, the inflation rate, the unemployment rate, exchange rates, economic growth rates, interest rates, price-earnings, firm size, market to book value, and so forth.

Since an investment portfolio return is defined as $$R_p = \sum_{i=1}^{n} X_i R_i,$$

where Xi's are respectively a proportion in which an investment is made in a security, i, the expected return E and the standard deviation $\sigma$ for a risky portfolio are respectively defined as $$E[R_p] = \sum_{i=1}^{n} X_i E[R_i], \text{ and} \quad (2)$$

$$\sigma_p^2 = \sum_{i=1}^{n} X_i^2 \sigma_i^2 + \sum_{i=1}^{n} \sum_{\substack{j=1 \\ j \neq i}}^{n} X_i X_j \sigma_{ij} \quad (3)$$

Techniques of maximizing the portfolio's expected return, $E[R_p]$ and minimizing the portfolio's risk, $\sigma_p^2$, have been well documented in many finance textbooks. However, the proposed techniques are often inadequate or even incomplete from most investors' point of view.

For example, the market portfolio under MPT exists only in theory. Since the market portfolio as suggested in MPT is only a theoretical construct, it is possible that efficient portfolios selected by sub-sampled stocks may outperform (or underperform) any available market benchmark index, which many investors use as a proxy for the market portfolio. Furthermore, properties of the probability distribution for security returns, as are given in equation (1), are not constant over time. To understand this, a great deal of theoretical research has been done in the area of MPT by utilizing various stochastic process models. However, there has been no definite conclusion as to how an individual portfolio should readjust itself to an optimum portfolio in a dynamic stochastic model. Consequently, it is quite difficult for an investor to plan ahead to maximize his terminal wealth when the probability distribution parameters change in the face of constantly changing investment environments in real time. In addition, as of the date when this application is filed, there has been no known computational facility currently available to individual investors through the Internet or other communication channels designed to show how an optimum portfolio should be formed or approached by taking into consideration all assumptions made in MPT.

Moreover, no known tool incorporating efficient portfolio modeling theories (e.g., CAPM) is currently available to investors through the Internet, or other communication channels, that is designed to provide many desirable features in helping investors to make their investment decisions with respect to portfolio management. Consequently, individual investors often have to rely on professional portfolio managers in making investment decisions using, among others, the above-mentioned market portfolio theories. These desirable decision-making features may include:

- To show how one can pick a scenario portfolio, which may outperform a given market index by selecting stocks through (i) various stock screening features, (ii) back tests, and/or (iii) virtual trades;
- To show how one can better manage his or her portfolios by recognizing the bid/ask spread, brokerage commissions, potential tax obligations, etc., in real time;
- To show how one can attempt to re-balance his or her own portfolios by suggesting various criteria or preferences with a possible trading band;
- To present a financial statement for each one of their investment portfolio accounts;
- To show how a risk level rises or falls in real time, as he or she manages his or her own portfolios;
- To execute and settle orders automatically in real time, especially those orders involving a basket of securities;
- To show automatically how investors could allocate investment assets in real time; or
- To provide various investment calculators for investment analysis purposes.

SUMMARY OF THE INVENTION

It is a general object of the present invention to provide a system and method capable of interacting with a user for receiving user determinable values or preferences of investment parameters to be inputted into the system for generating an investment scenario portfolio based on the user defined parameters.

It is another object of the present invention to provide user interaction with a computer network system over the Inter or Intra-net for assisting the user in defining user determinable parameter values or preferences and for monitoring in real time an existing (or a scenario) portfolio generated by the computer network system based on the user inputs.

It is yet another object of the present invention to provide a system and method capable of automatically re-balancing existing and/or scenario portfolios based on the user determinable parameter values and of automatically executing trades of securities to form a new portfolio.

In one embodiment, the present invention comprises a computer server connected to a client system through a first network and connected to computers of a plurality of brokerage houses through a second network, wherein the computer server has one or more mathematical computational models for computing optimized portfolios based on various user-determinable portfolio rebalancing strategies or preferences and has an executing engine for executing security trades in response to results of the calculated optimized portfolios, either automatically or manually as directed by a user.

The above-stated objectives are for illustrative purposes and, thus, do not limit the scope of the present invention. Additional features and advantages of the present invention will be set forth in the descriptions that follow. The objectives and other advantages of the invention will be realized and attained by the structure particularly pointed out in the written description and claims hereof as well as the appended drawings. It will be further understood that the drawings are for purposes of illustration and are not to be construed as defining the scope of an invention.

DETAILED DESCRIPTIONS OF EMBODIMENTS

The present invention entails a method and system for managing investment portfolios through a mathematical model and electronic on-line or off-line trading via the Inter- or Intranet communications technologies. The method is an integrated financial planning package that can be delivered directly to an individual investor/user and/or other investment professionals. The present invention is capable of managing cash (or cash equivalent) accounts as well as all other investment accounts in fixed income bonds, stocks and other financial assets including derivatives either singularly or collectively both in automatic and/or manual modes.

Figure 1:
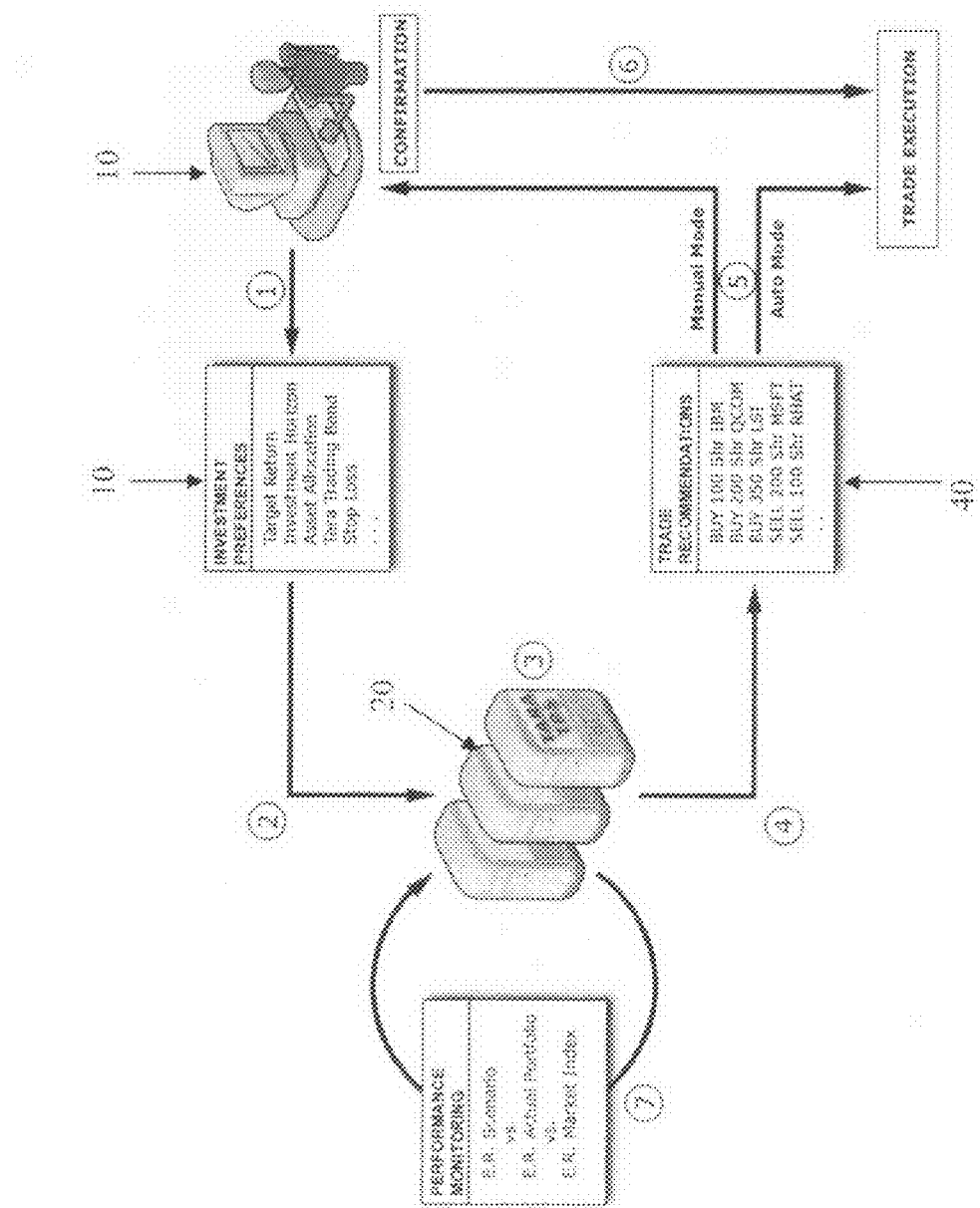
FIG. 1 shows a basic implementation of the present invention.

FIG. 1 illustrates a basic physical configuration and procedural steps of a preferred embodiment of the present invention.

Step 1 A user will be asked to give detailed information regarding his/her individual investment preferences using a HTML form on a client system 1 and received by a computer server 20. The computer server 20 is connected to the client system 10 through a network 30. The network 30 can be a wired or a wireless communication network capable of facilitating Internet or Intranet services to the client system 10. Consequently, the computer server 20 may receive from the client system 10 the user's investment preferences, criteria or strategies such as investment horizon, minimum cash reserve, annual target return, desired risk level, stop loss, upper/lower limits for portfolio rebalance, return tolerance, and other strategic rebalancing strategies. Upon receiving input information from the user the computer server 20 may update a database maintained by the computer server 20 and containing investment profile information of the user.

Step 2 The computer server 20 sends criteria queries to the client system 1 using additional HTML forms to define the details of a scenario portfolio the user wishes to create. The user on the client system 10 will define his/her investment styles by choosing a set of user determinable fundamental, technical and/or other market value criteria. The computer server 20 will then process these query criteria received from the user and will select securities in response to the user defined criteria to satisfy the user requirements in styles and preferences of investments, and will save these selected securities information for future references.

Step 3 From the client system 20, the user can invoke a mathematical analysis engine or program on the computer server 20. The mathematical analysis program on the computer server 20 will retrieve all the user-defined investment data and configuration associated with the user. The mathematical analysis program will also load the stock information currently under analysis, such as the real time prices for these stocks, and will calculate a cash balance of the existing portfolio. The central computer server 20 retrieves data for return on market portfolio from its database server, constructed based on returns data on a plurality of investment style indices as an optimal portfolio. Said returns on a plurality of investment style indices are an optimal linear combination of securities, which belong to a plurality of asset classes as investment styles. At least the following six (6) basic domestic asset classes are considered.

1. Large cap growth
2. Large cap value
3. Mid cap growth
4. Mid cap value
5. Small cap growth
6. Small cap value In addition, large cap index return is an optimal linear combination of large cap growth and large cap value; mid cap index return is an optimal linear combination of mid cap growth and mid cap value; small cap index return is an optimal linear combination of small cap growth and small cap value. In the meantime, growth index return is an optimal linear combination of large cap growth, mid cap growth and small cap growth; and value index return is an optimal linear combination of large cap value, mid cap value and small cap value. Return on domestic market portfolios, which may resemble returns on S&P 500 or Dow Jones Industrial Average, would be an optimal linear combination of all investment style indexes. Similarly, an international capital market portfolio return is also anticipated.

Step 4 The computer server 20 ranks the set of stocks against the user preferences and outputs a list of recommended stocks and/or the numbers of shares of each recommended stock to buy or sell against the existing portfolio in order to form an optimum scenario portfolio. The portfolios are continuously monitored by the computer server 20 and when a pre-determined triggering event occurs, a trade recommendation will be sent to the user through the Internet, Intranet or other communication channels.

Step 5 Each calculation by the server 20 is compiled into a readable result set with recommended trade decisions and displayed for the user via an Internet site, Intranet site, or on other display devices such as net appliances. The user on the client system 10 will receive the trade recommendations on an HTML form or on a Java applet.

Step 6 The user on the client system 10 can specify to execute the trade recommendations either on an automatic mode or on a manual mode. Using the automatic mode, all trade decisions will be executed automatically and independent of user administration and monitoring. With the manual mode employed, the user will receive all trade recommendation generated by the computer server 20. Thus, the user can decide whether or not to accept these trade recommendations. All information regarding security trades are sent to the computer server 20 by the user and are executed by the computer server 20. When the user deploys the manual-trading mode, he or she can approve all, some or none of the recommendations from the recommendation set. Alternatively, the user may specify a user-selected stock for the computer server 20 to trade.

Step 7 The present invention will run at predetermined regular intervals to monitor the performance of the user's existing investment portfolio. The present invention will also regularly generate an optimal scenario portfolio based on the user's data and market conditions and will compare expected returns on the scenario portfolio against that of the existing portfolio and market index returns. Performance is measured for periods since the inception of the existing portfolio and the last trade date leading up to the present existing portfolio. Performance monitoring will affect the trade decision recommendations being sent to the investor (i.e., the user).

With this method and system, MPT is implemented in such a way that a client portfolio selected will satisfy not only the investor's target return and risk requirements in real time but also the investor's investment planning horizon; investment styles; benchmark; the bid and ask spread; brokerage commissions; various taxes, and so forth.

Further details as to the mathematical model, the user determinable investment parameters, criteria or preferences, the physical configuration, and other considerations according to the present invention are described below.

Basic Structure

In the preferred embodiment, the present invention is an integrated personal financial planning system, or a system of securities investment in general for all financial advisors, hedge fund managers, mutual fund and other retirement plan managers, providing various analytical tools, accounting statements and securities order/execution systems through the Intra-, Internet or other communication technologies. The present invention provides investors and all professional investment managers with a complete integrated set of financial tools and algorithms to help investors trade securities like professional fund manager.

First, through a series of investor questionnaires in the form of HTML forms or the like provided to the user by the computer server 20 over a network 30 such as the Internet, the user can specify his expected target return, $R_T$, for his entire investment portfolio (inclusive of his cash balances) and make revelation about his preferences toward risk in terms of beta, $\beta_T$. The present invention may implement this task through investor questionnaires. For example, a certain range of beta coefficients may lead to aggressive growth, while certain other beta values may be conservative in nature insofar as the risk preference is concerned. Given the rate of interests paid on his cash management account and on Treasuries; and the return on the investor-specified particular investment style fund, $R_I$, an optimal allocation between his cash management account and his investment portfolio is given by:

$$R_T = \omega R_c + (1-\omega) R_I$$

$R_T$ is the expected return on his investment portfolio. The symbol, $\omega$, is the proportion invested in cash or cash equivalent assets, e.g. money market funds, Repurchase Agreements, CDs, and the like, and consequently, $(1-\omega)$ is the proportion invested in a portfolio of risky assets. $R_c$ is the return on the cash account and $R_I$ is the rate of return on a particular investment style portfolio of risky assets. Under Modern Portfolio Theory (MPT), if the expected return on market portfolio is $R_m$, and $\beta_I$ is the beta risk of portfolio I, $R_T$ can be further defined as $$R_T = R_c + (R_m - R_c)\beta_I$$

In view of the fact that $R_m$ is almost impossible to measure in reality, the present invention bases its return on the market benchmark, $R_m$, based on the investor's investment styles, e.g. small caps, value stocks, etc., unlike in the case of MPT. To be more specific, the market portfolio is viewed as an optimal portfolio of various investment style funds. This return on the market benchmark will be one of the major advantages in the present invention as will be discussed later below.

An optimal asset allocation φ between fixed income and equity securities is given by:

$$R_I = \phi R_b + (1-\phi) R_s$$

The expected return on a particular investment style fund, $R_I$, will be computed by a portfolio weight, which maximizes an objective function $(R_I - R_c)/\sigma_I$. The symbol $\sigma_I$ is the standard deviation of the portfolio's return. The expected return on a stock portfolio can also be computed similarly by maximizing an objective function, $(R_s - R_c)/\sigma_s$ with respect to φ's, proportion in which bonds and stock portfolios are combined to form an optimal asset allocation.

Alternatively, expected returns and the standard deviation on a bond and stock portfolio can be determined separately. First, given the investor's investment planning horizon, for example, a duration matching principle can be employed along with the bond's convexity and the yield to maturity to compute the bond portfolio's anticipated horizon yield. Second, an optimal equity portfolio can also be formed by a maximizing function, $(R_s - R_b)/(\sigma_s - \sigma_b)$, similar to the maximizing function introduced previously. Finding the optimal value of the expected return and the standard deviation for the equity portfolio will then be a trivial mathematical solution. Selecting a set of mutual funds is straightforward and will follow the similar procedure. Thus the present invention determines the investor's asset allocation, cash management account, optimal bond, stock or even mutual funds portfolios in real time while managing the user's investment risk automatically. For example, risk can be measured by using a "Risk Thermostat" according to a formula:

$$\beta_I = \phi \beta_b + (1-\phi)\beta_s$$

The optimal asset allocation thus obtained by the present invention for the portfolio may differ from what the user wishes to allocate, in which case the expected return on his aggregate investment portfolio, $R_I$, will be recomputed by using the investor-specified asset allocation. This will result in a change in ω and $\beta_I$. An optimal portfolio of risky assets will be described as follows.

Figure 2:
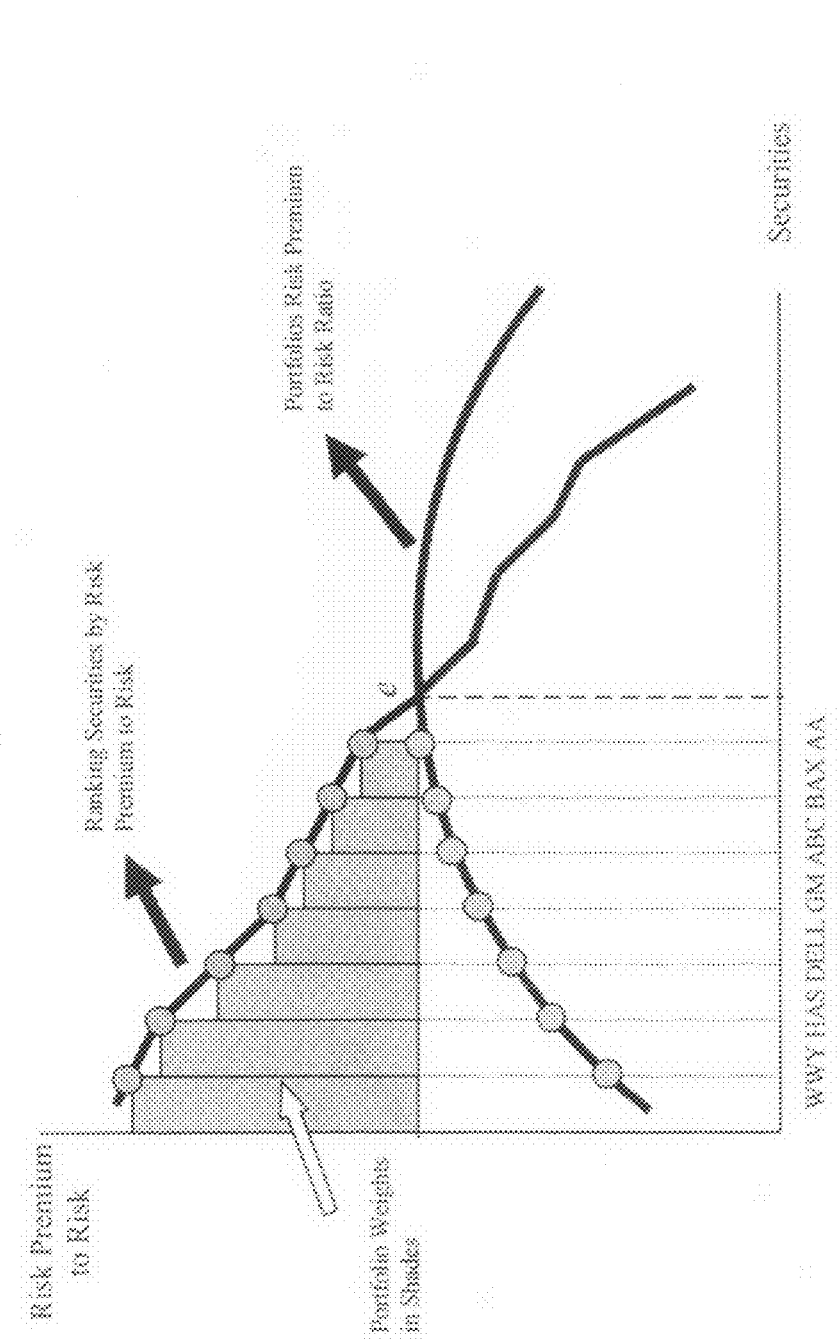
FIG. 2 shows an Expected Risk Premium chart demonstrating the way in which an optimum scenario portfolio is determined with its expected risk premium to risk function.
Figure 3:
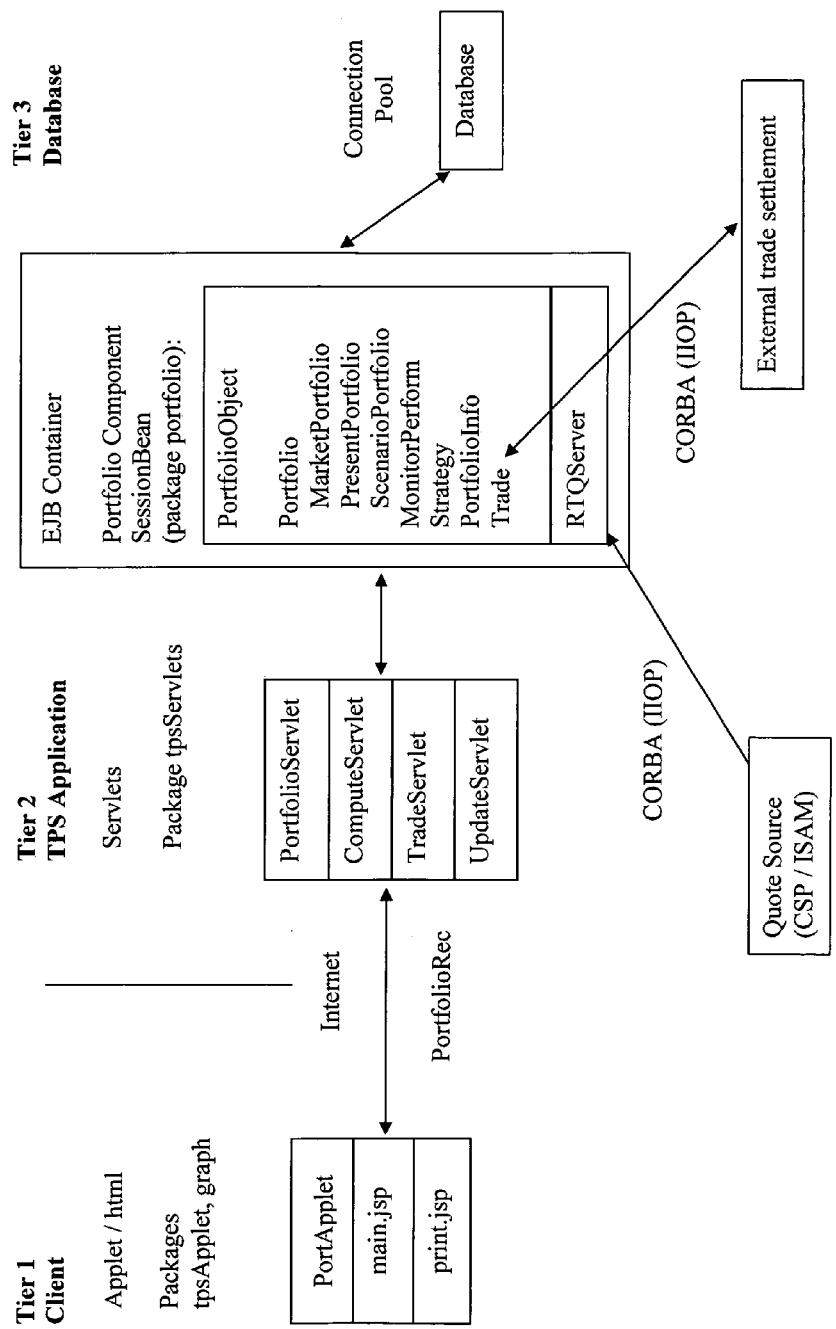
FIG. 3 shows a three-tier logic structure in functional architecture overview of the present invention.
Figure 4:
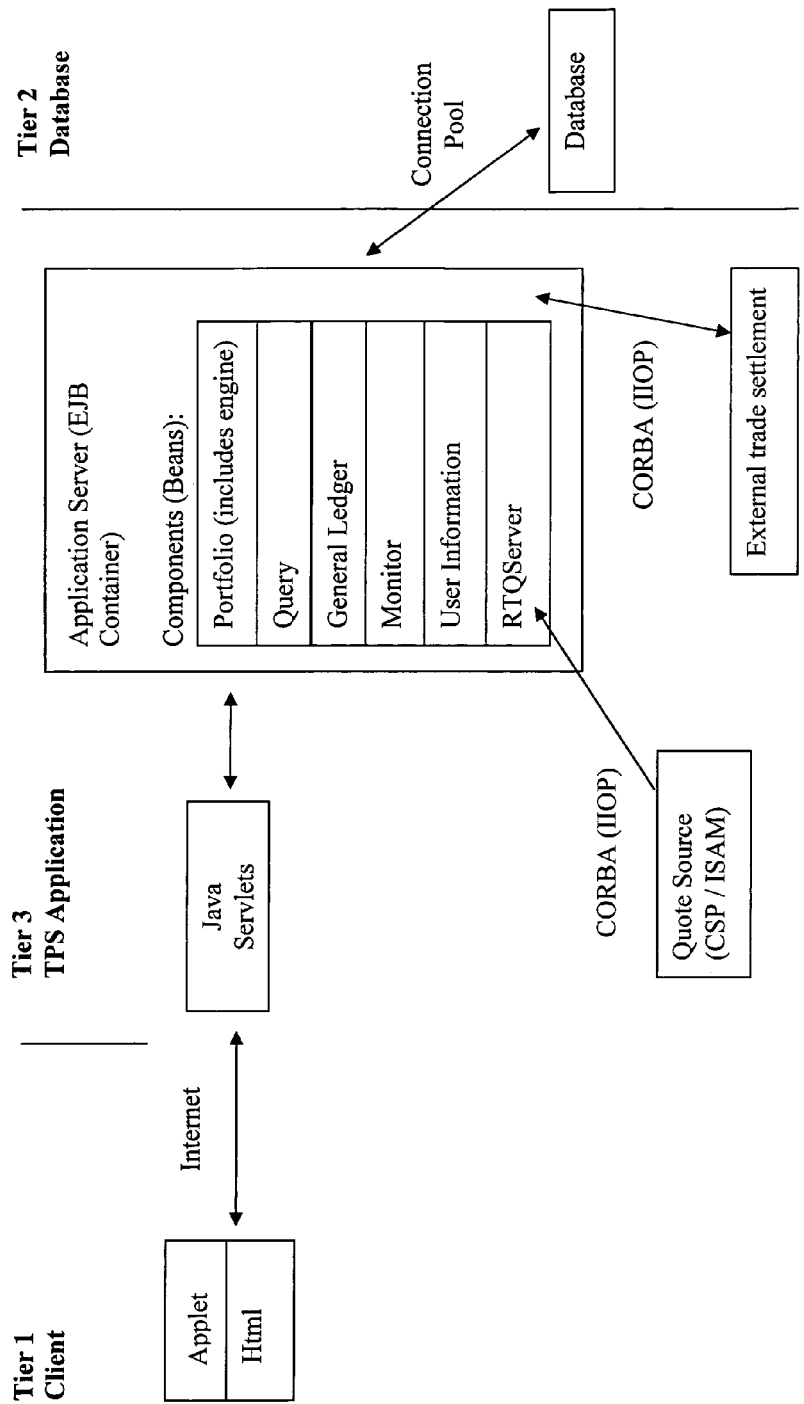
FIG. 4 shows another three-tier logic structure in functional architecture overview of the present invention.
Figure 5:
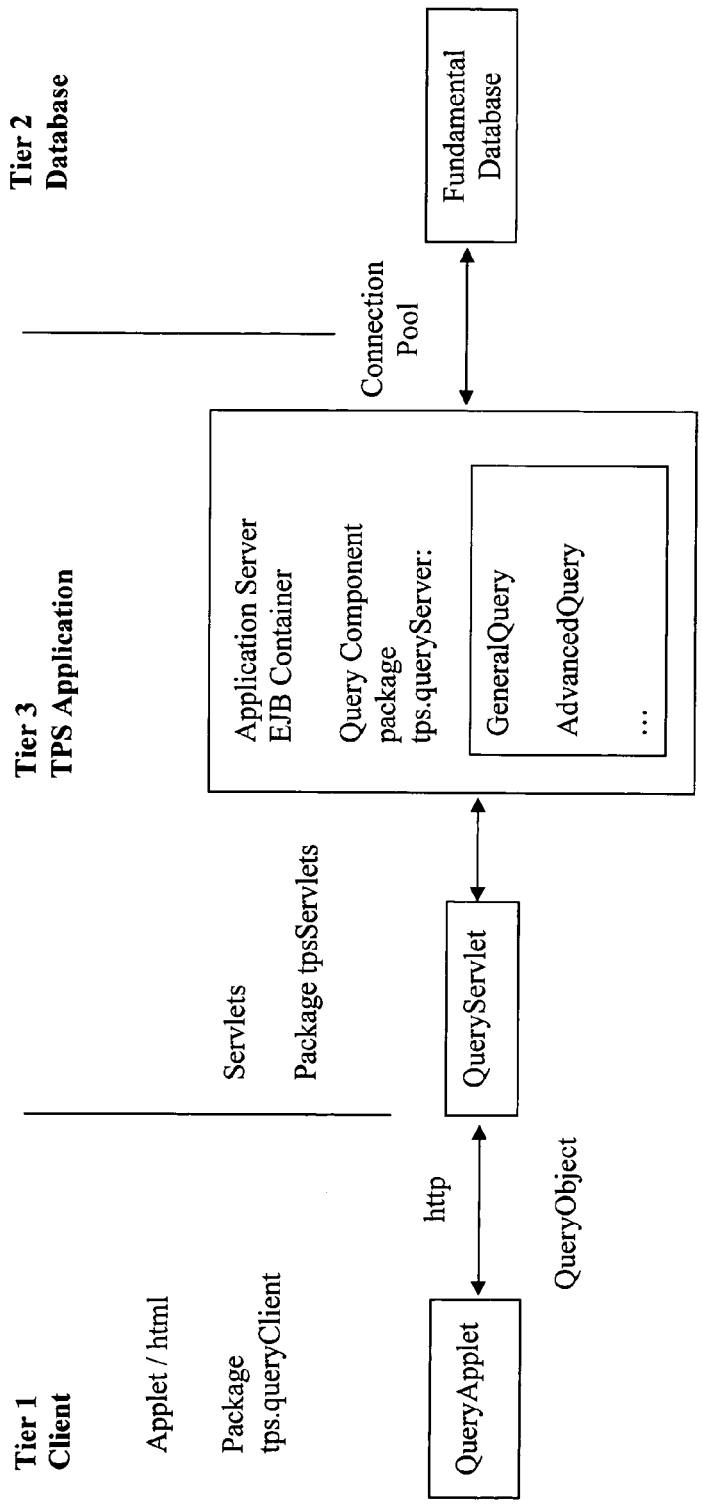
FIG. 5 shows a three-tier logic structure in query functional mode of the present invention.
Figure 6:
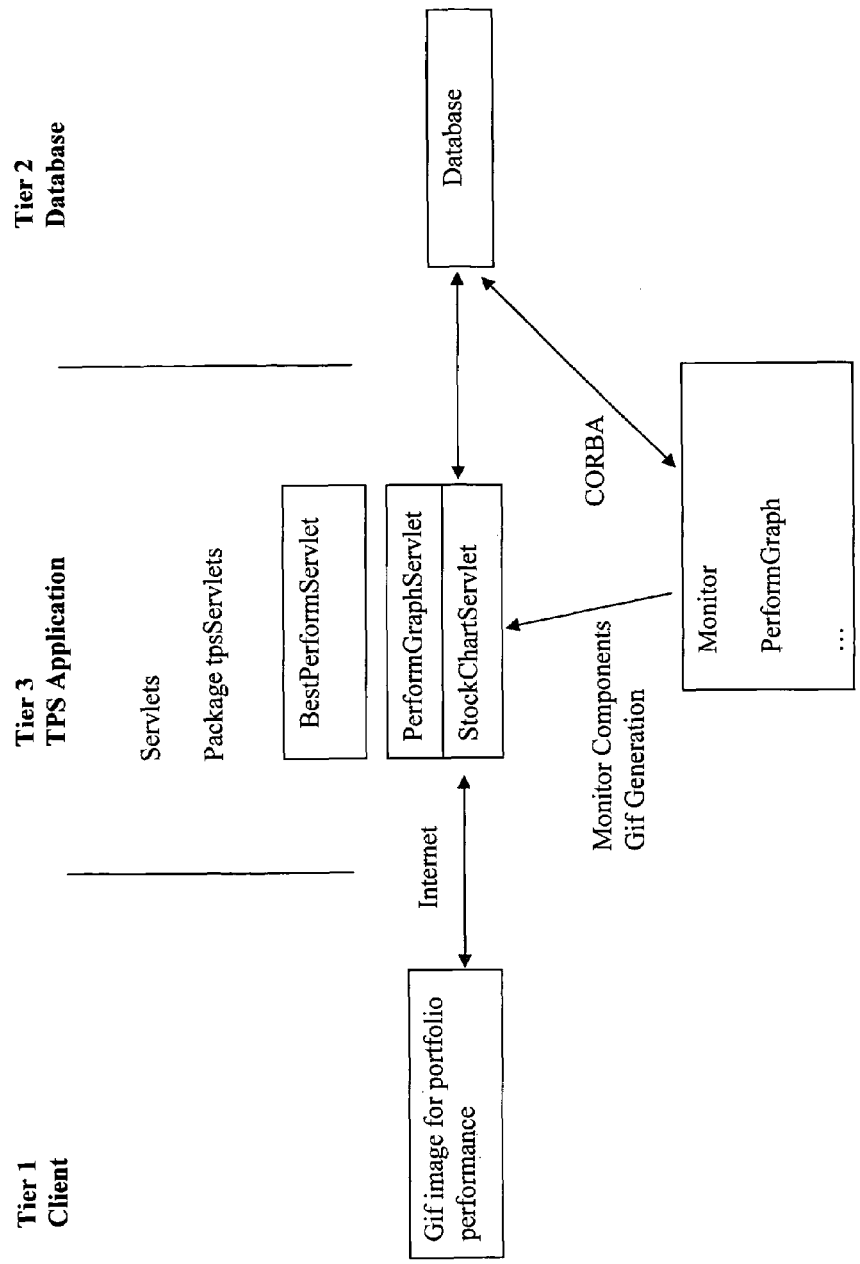
FIG. 6 shows a three-tier logic structure in monitoring/graph functional mode of the present invention.
Figure 7:
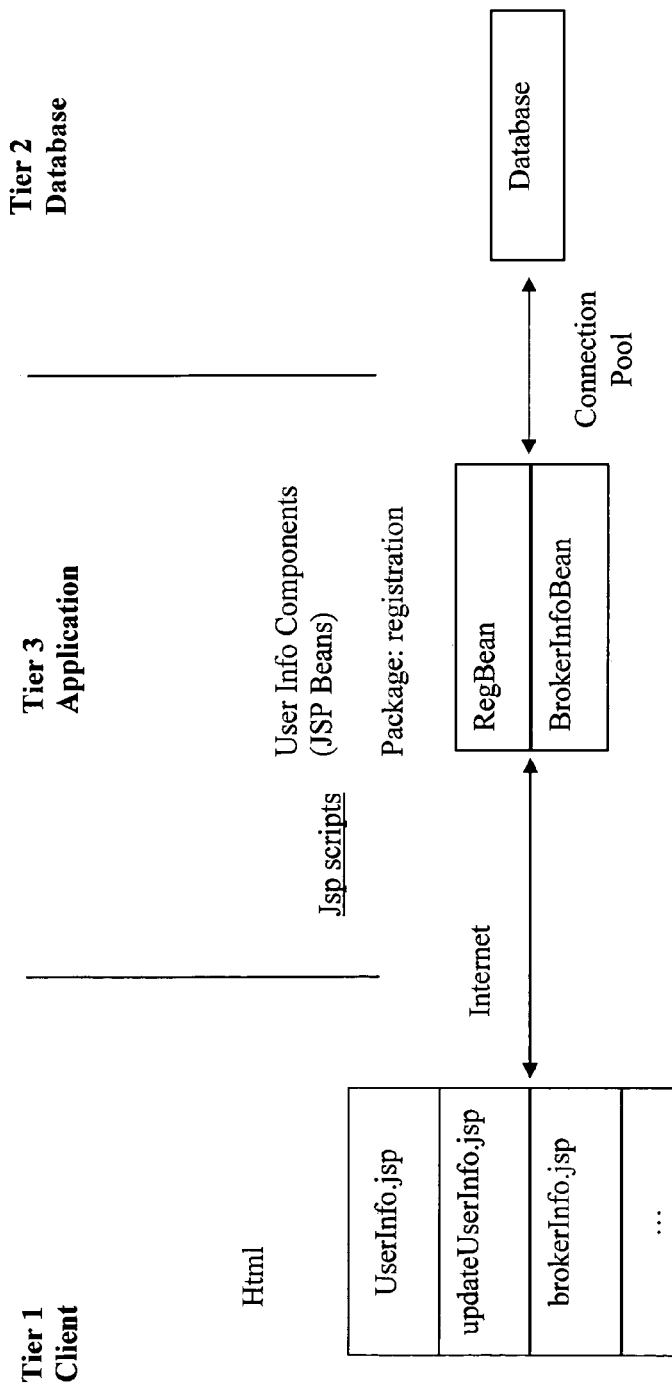
FIG. 7 shows a three-tier logic structure in user registration/preferences functional mode of the present invention.
Figure 8:
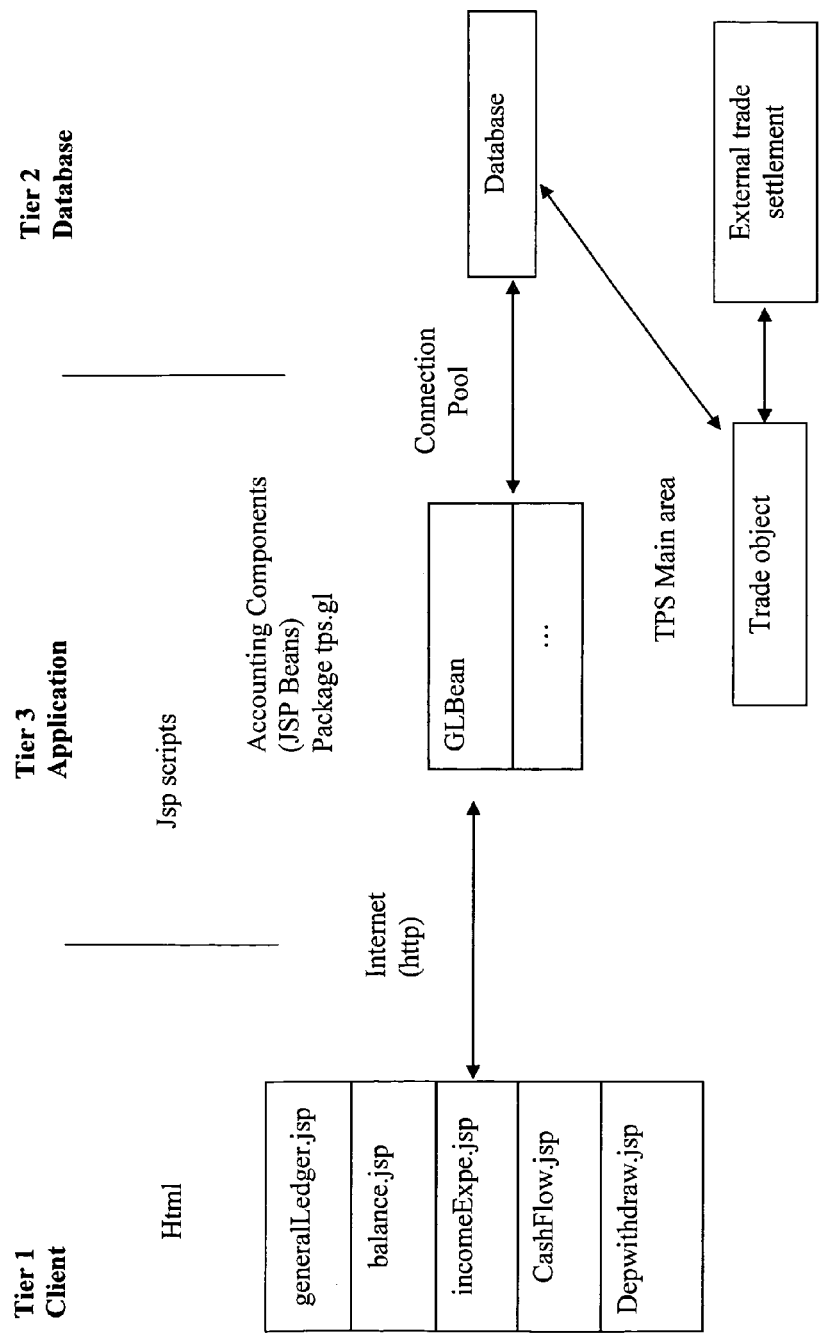
FIG. 8 shows a three-tier logic structure in financial database functional mode of the present invention.
Figure 9:
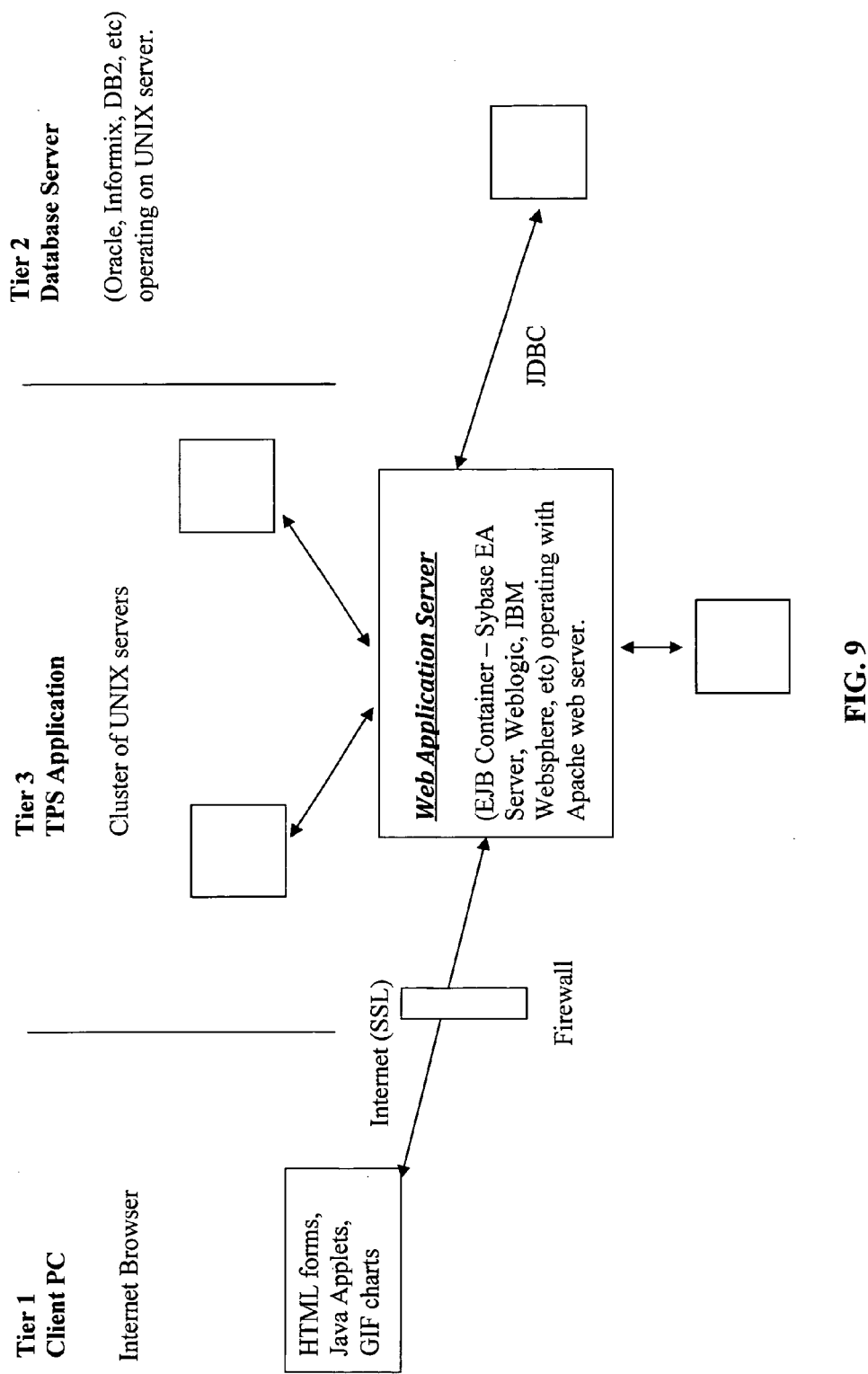
FIG. 9 shows a three-tier logic structure in platform overview of the present invention.

As FIG. 2 illustrates, first, securities will be ranked in a descending order according to their expected return premium to risk ratios, the risk being defined as similar to the above-mentioned beta, see the declining portion of the graph. Beta for the present invention is similar to but different in several aspects from the traditional MPT beta, in the sense that security returns are not regressed against what is often considered as the aggregate market index, e.g. Dow Jones, S&P, etc., but against a market index which represents a particular group of securities satisfying the investor style requirements. Each user portfolio may have a peculiar various style-based market index generated by the computer server 20 based on the individual user input information, criteria, preferences, etc. Second, scenario portfolios will be formed by considering a portfolio of the best or highest ranked securities, a portfolio of the best and the next best securities, a portfolio of the best, the next best, and the next, next best securities, and so forth. (See the inclining portion of the graph in FIG. 2). Third, an optimal portfolio is determined where a marginal contribution of an additional security to the portfolio turns negative. (See the point denoted by "e" in FIG. 2). Fourth, proportion in which investments should be made in each security in the portfolio is determined according to the contribution that each security makes to the portfolio. If the entire contribution made by all securities in the portfolio can be represented by the shaded triangular area in FIG. 2, the contribution that each security makes to the portfolio is that portion of the shaded area corresponding to each security. This is similar in concept to what is known as "consumer surplus" in basic economics.

Given the investment objectives, preferences and styles provided by the user, the computer server 20 runs an algorithm based on one or more of the computational mathematical model(s) stored in the computer server 20 to form an optimal initial scenario portfolio. In addition, the investor's target return will be used to automatically compute its accompanying risk, which will be used to determine an optimal size of the scenario portfolio. Expected returns on the scenario portfolio are also calculated. To form an initial portfolio, the expected return should exceed the investor's target return and the expected returns on the aggregate market benchmarks, e.g., the Dow Jones, or other investment style index returns, etc. Once the initial scenario portfolio is formed, the performance of the scenario portfolio will be constantly monitored in real time. A subsequent algorithm would run by the server 20 in every pre-specified fixed time interval to suggest a different composition or configuration of risky securities. Expected returns on a new scenario portfolio are compared with those on the pre-existing portfolio and the market benchmarks. The computer server 20 may then report the comparison results to the investors via Inter-, Intranet, or other communication channels.

As compared to the Capital Asset Pricing Model (CAPM) that the CAPM prices securities either under the assumption that the probability distribution parameters for security returns are stationary or that security prices follow random walk processes, the present invention recognizes fractality in securities returns and dynamically changes distribution parameters for rebalancing portfolios, existing or scenario, to achieve efficiency. The present invention also suggests various re-balancing strategies by comparing the expected returns on the existing portfolio to those on scenario portfolios subject to a user specified parameter named Tara Trading Band limit. The Tara Trading Band limit defines both lower and upper bound at which point the user's portfolio may require a rebalancing trade. If the user sets the Band high at a level, rebalancing trades may occur less frequently than when the Band is set low.

The investor may specify a desirable frequency of rebalancing based on how actively the investor wishes to manage his funds. Examples of re-balancing strategies are shown below. In one embodiment and for purposes of illustration only, the following symbols are defined for demonstrating the present invention.

| | |
|---|---|
| E[S] | An expected return on a scenario portfolio |
| v | A value of a new scenario portfolio divided by that of an existing portfolio |
| E[0] | An expected return on the existing portfolio |
| E[M] | An expected return on the market benchmark |
| G | A geometric return on the existing portfolio since inception |
| H | A holding period return on the existing portfolio since last trade |
| HS | A holding period return on the existing portfolio since inception |
| ST | Stop loss since inception. Default = 10% |
| T | Target return |
| M | A geometric return on the benchmark portfolio since last trade |

-continued

| | |
|---|---|
| m | A holding period return on the benchmark portfolio since last trade |
| L | A lower bound filter. Default = −0.75% |
| U | An upper bound filter. Default = 1.5% |
| S | A current value of the existing stock portfolio |

In addition, the following nine (9) different trading modes are also defined for further simplistic illustration of the present invention.

(1) Initial Mode
1.1 E[S]v>T>E[0]
1.2 E[S]v>E[M]
(2) Stop Loss Mode
During monitoring of the portfolio, if the investor's stop loss limit is x % and if HS←−x % and S>0 then the present invention will attempt to liquidate the investor's entire holdings and puts them into cash account. A HOLD flag will be clear and a TRADE flag will be set with a query message like "Your portfolio has reached your stop loss. Do you wish to have your investment liquidated to limit losses?" to the investor. If a reply from the investor is affirmative, SELL orders of securites will be automatically executed. If the reply is negative, the system is resumed back to normal mode to continue monitoring the portfolio performance.
(3) Redemption Mode
When HS>T and S>0 for the existing portfolio, the system will prompt with a query message like "You have now achieved your target return. Do you wish to have your investment redeemed?" to the investor. If the reply is affirmative, a REDEMPTION flag is set and a redemption algorithm gets executed by the computer server 20. If negative, the system resumes back to the normal mode to continue.
(4) Buy & Hold (P-) Mode
When E[S]v>T>E[0], the EPS is in a Buy & Hold mode. As such, the system will attempt to buy securities either already listed in the existing portfolio or listed in a scenario portfolio. The system will compare the existing portfolio against the scenario portfolio and will determine which and how may shares of the securities in the existing portfolio need to be traded.
(5) Market (M-) Mode
M1. E[S]v>M>E[0]
M2. E[S]v>E[M]>E[0]
(6) Bear (R-) Mode
E[M]<M
(7) Bull (B-) Mode
E[M]>M
(8) Lower Filter (L-) Mode
L1. H<0
L2. ABS(Hv)>ABS(L)
L3. ABS(m−Hv)>ABS(L)
(9) Upper Filter (U-) Mode
U1. H>0
U2. Hv>U
U3. (Hv−m)>U Based on the user determinable parameters or values mentioned above, the following rebalancing strategies by the present invention are possible.

(1) Buy and Hold Strategy
TRADE only if P-Mode satisfies.
(2) Managed Strategy
HOLD will change to TRADE, if E[S]v>E[0]; and R-Mode and L-Mode; or
B-Mode and U-Mode
(3) Benchmark Strategy
If E[M]<M, TRADE if both (M1) and (M2) satisfy.
If E[M]>M, TRADE only if (M2) satisfies.
(4) Passive Benchmark Strategy
TRADE if both P-Mode and conditions for Benchmark Strategy satisfy.
(5) Managed Benchmark Strategy
TRADE if conditions for both Managed and Benchmark Strategies satisfy.
(6) Profit Only Strategy
TRADE if P-Mode and the condition that Hv>(L+U)/2 satisfy, e.g. Hv>(−0.75+1.50)/2=0.375%

Managed strategies using L- and U-Modes can be further simplified by introducing the Tara Trading Band (TB) parameter defined as TB=(L+U)/2, where L=−U/2. When TB is set by the investor, it would automatically set values of L and U.

Actual portfolio weights achieved under various realistic constraints to parameters just mentioned above may differ considerably from optimal weights as suggested by the mathematical algorithm in the computer server 20. This would be so, especially when the available cash of a particular investor may be limited to buy enough shares of securities, as the system would have recommended. Thus it would be unrealistic to achieve the same expected return on an existing portfolio as that from a scenario portfolio, which is supposedly optimal, proposed by the system. A series of mathematical iteration to adjust to optimal portfolio weights by correcting the existing weights may result in continuous trading resulting in tremendous transaction costs. In many cases the final solution reached through continued trades might converge either with a dampening or explosive oscillation. Consequently, the present invention entails the investor to specify a tolerance level for the expected return on the existing portfolio compared to that on a scenario portfolio in order to force an approximate solution during calculating an optimized performance of the existing portfolio.

Features and Architecture

An embodiment of the present invention includes the following logical or business components in the computer server 20:

Query component
Portfolio component
Accounting components
Monitoring components
Quote and chart components
User account information components Each component is respectively a combination of software and/or hardware entities, such as a set of mathematical algorithm codes or an electronic circuit, which describes the business logic or performs a computation.

Query Component

A Query module of the computer server 20 assists the user in screening stocks and selecting these into his/her portfolio. The user specifies his/her investment requirements (e.g., the P/E ratio, etc.), preferences (e.g., the industry type, etc.) or other criteria to the computer server 20. The Query module then generate queries (e.g., a list of stocks satisfied the user requirements and preferences) based on the above-mentioned user-specified data such as the industry type, P/E ratio, etc., and feedback the queries to the user. The user may select stocks into his portfolio from the list returned by the query procedure.

The data used by the Query module to generate the query list typically come from databases that is widely available with or without fees to the public over the Internet and other sources, and these data should be updated by the computer server 20 every night for maintaining the most updated information of investment data.

Portfolio Component

The Portfolio Component includes several sub-modules for the computer server algorithm, trading strategies, portfolio preferences, and/or trading. One sub-module implements the predetermined mathematical algorithm derived from the Modern Portfolio Theory, which determines the types and quantities of stocks, bonds and mutual funds to trade for the user portfolio. The output of the computer server 20 engine is a scenario portfolio theoretically the most efficient portfolio fitting the user's investment objectives, given constraints imposed by practical considerations, such as the size of a round of stocks.

Real time data of stocks is constantly monitored by the computer server 20 to determine the values of the user's present existing portfolio and the scenario portfolio computed by the server engine. Expected returns of the stocks in the portfolios (existing or scenario), the actual track record of the present existing portfolio, and market conditions are used to trigger actual trading of securities in the existing portfolio when necessary.

Trading may be in a manual or an automatic mode. Automatic mode may be convenient for users/investors testing their investment strategies with "virtual cash". Since the theoretically optimal portfolio may be slightly different at each point in time the triggering module is used to limit the frequency of re-balancing.

The data used for this portfolio component comes from the real time data sources, such as current market quotes of stocks over the Internet, and the historic database, such as the previous closing quotes of the stocks. The database for all stock components in the existing portfolio should be updated after each trading day.

Accounting Component

The accounting component maintains a double entry accounting system in the computer server 20. Information from account creating, transfers and trading is stored into a general ledger. The general ledger may be presented to the user for inspection whenever requested.

Monitoring Component

The performance-monitoring component tracks the users' portfolios and the market returns. The update results are output in the form of GIF charts to the users.

Quote and Chart Components

Quote and chart components are used to generate quotes for price and trading history, or other related information of bonds, stocks, and mutual funds. Thus, they can be used to provide the users information for research on individual stocks specified by the users.

User Account Information Components

User account information components maintain and extract user information such as email addresses and personal details.

Architecture

In a preferred embodiment, the logic implementation of the present invention (henceforth referred to as Tara Portfolio Solutions or "TPS") is implemented in modern three-tier architecture. In addition, all business logic and computational algorithms are executed on the computer server 20. This allows for a fastest response time, minimal requirements for the client system 10 (e.g., a PC or a PDA), and flexibility in deploying upgrades. The three-tier architecture of the invention is illustrated in FIGS. 3-9 as:
Tier 1—User interface
Tier 2—Database server
Tier 3—TPS Application

Tier 1

User Interface

A user interface accepts information from a web server and presents it to the users. Since no business logic is performed on the client system, development of the user interface can be separated from development of server application software. It eliminates software installation requirements on clients' systems (PCs or PDAs), other than an Internet browser enabling the users to communicate over the Inter- or Intranet. If necessary in the future, the entire user interface could be switched or updated with minimal changes to the server application software by a service provider.

Tier 2

Database server

Stock market and the portfolio information is maintained on a database server. The database server may be incorporated into the computer server 20 or may be independent from, but connected to, the computer server 20. The database server includes a market database containing information relating to historic stock prices and company fundamental data as well as return on a plurality of investment style indices and market portfolio. The database server also includes a user database for maintaining information related to user information, portfolio preferences, accounting, and portfolio performance.

Tier 3

TPS Application

The third or middle tier includes a web server, business components, and, in the case for large scale uses, an application server. The business components may be independent to methods or means used by the computer server 20 to relay and present information to the users. Thus, they can be used within different server environments, for example, with or without an application server.

Java Servlets are the glue between the web server and the business components. These Java Servlets invoke the business components and relay the information retrieved or generated to the client browsers over the Inter- or Intranet. An HTML script type format, similar to the ASP's widely used in the industry, can be used with Java Server Pages. The HTML script is itself a specialized Java Servlet.

The application server provides a container for the business components to "live in." It is used for a web site with heavy traffic where continuous availability is critical. It provides for load balancing and fail-over with a cluster of several server machines. In other words, the computational load can be split over a number of server machines without loss of the user's current session. If one server machine is removed or unavailable from the cluster, the others will fill in to provide continuous services.

Platform

Software

The web site is able to be used by anyone with an Internet browser and an Internet connection. The web site is presented as HTML pages, Java Applets, and GIF charts to maximize the interactive nature of the site while minimizing the client PC requirements. In order that the site be used without any special plug-ins, Java 1.1 (AWT) Applets are used. However, the software and applications used may be updated as new technologies or software are constantly developed and available in the market.

The server contains Java Servlets that send HTML outputs and communicate to Java Applets running on client PCs or PDAs via the Internet. In order to allow that any browser may be used and to permit access through firewalls, the communication method used between the client systems and server is by HTTP tunneling.

In the preferred embodiment, the server programs have been developed in Java for the following reasons:

- More scalable due to cross platform nature compared with other popular systems (e.g., server side scripting with VBScript or Java Script, Perl, and PHP) mostly used for smaller scale web site development.
- Allows for better organization, re-use of code, and maintenance compared with scripting languages.
- Easier to develop software as compared to systems previously used for large scale web site development (e.g., C++ with CGI, NSAPI, ISAPI, or server side Active X components from ASP)
- Ease of use with Apache web server (currently with approximate 60% of Internet), Microsoft IIS (currently with approximate 22% of Internet), or other web servers as compared with other proprietary systems.
- Ease of use in a clustered environment through the use of application servers compliant with the Sun EJB specification (e.g., Sybase EA Server, BEA Weblogic, IBM Websphere, etc) to provide for use with a large number of customers.
- Publication of and widespread use of Java Application Programming Interfaces (API's) by Sun allows many options for fundamental software and hardware used such as web servers, databases, and application servers, and server machines. Vendors for software conforming to these specifications include: Microsoft, Sybase, IBM, Oracle, Informix, BEA, Sun, and Hewlett Packard.

The server programs may run on any platform that supports Java. This means that web site components can be developed and tested on inexpensive Windows PCs or Linux servers and then moved to large-scale UNIX servers for production use. The clustering ability means that the site can continue to operate even if one machine is temporarily out of order and the processing load can be balanced between server machines. The decision to add more powerful and expensive server machines can be delayed until the network traffic demands it.

The selection of Java language in developing the server programs for the preferred embodiment of the present invention is based on the above-mentioned advantages provided by the Java language. However, future techniques or technology advancement may provide new solutions other than Java for developing the server programs. As a result, the present invention is not limited in any sense by way of using the Java language in the server programs of the preferred embodiment.

Security

In general, there are three most encountered security risks in operating an online trading Internet business are:

- External and unauthorized use of the Internet to gain access to server machines and database contained therein;
- "Spying" on Internet traffic in order to steal customers' account or privacy information; and
- Unauthorized physical access to server machines.

These potential security breach problems should be addressed and prevented when implementing the present invention. Many commercial security programs are currently available for installation in the computer server 20. Alternatively, proprietary security programs may be developed and/or incorporated into the server programs.

The described embodiments of the present invention are intended to be exemplary and variations of the described embodiments may be made without deviating from the spirit and scope of the present invention as defined in the appended claims.

The invention claimed is:

1. A method for portfolio management comprising:

receiving at a computer server from at least one client system associated with an investor, a plurality of investment parameters comprising investment planning horizon, risk tolerance or target risk level, target investment returns, a preferred cash allocation, a strategy of portfolio rebalance, and investment styles based on at least of market value, fundamental or technical criteria, and user-defined securities;

responsive to the receipt of said investment parameters, said computer server sending queries to database server system, thereby selecting a list of initial candidate securities based on one or more received said investment parameters;

receiving at the computer server said list of selected initial candidate securities from the database server;

obtaining at the computer server real time and historical market price data for each of initial candidate securities in the list;

inputting said received real time and historical market price data and investment parameters into a mathematical algorithm stored in the computer server;

generating an optimal investment portfolio, wherein said optimal investment portfolio is generated based upon said real time and historical market price data and said plurality of investment parameters received from said investor and wherein said optimal investment portfolio optimizes risk and return on the portfolio;

retrieving said investor's existing portfolio of a plurality of securities positions in terms of price and the number of shares from a database linked to said computer server;

evaluating by the computer server, said optimal investment portfolio with respect to the return on a domestic market index portfolio, wherein said domestic market index portfolio is constructed as an optimal linear combination portfolio of a plurality of predefined investment style indices returns, each one of said investment style indices being calculated as an optimal portfolio of all listed securities satisfying corresponding investment style index criteria;

comparing by the computer server, said optimal investment portfolio with said market index portfolio in terms of risks, returns and likelihood of satisfying investment goals as specified in the received investment parameters;

based on outcome of said comparison, generating by the computer server, an alternative scenario portfolio which rebalances said the investor's existing portfolio under a preset rebalancing strategy relative to said optimal scenario portfolio in accordance with said user-defined investment parameters and market conditions, wherein said alternative scenario portfolio forms basis for rebalancing said investor's portfolio stored in said database, and is comprised of a plurality of identified securities with associated quantity of shares to be traded;

executing trades using the computer server, for each of identified securities based upon said alternative scenario portfolio thereby rebalancing the investor's existing portfolio;

updating said investor's existing portfolio in said database with the updated rebalanced portfolio.

2. Wherein said step of executing trades is performed automatically.

3. Wherein said step of executing trades is performed manually.

* * * * *